April 29, 1947.  E. LABIN ET AL  2,419,571
SELECTIVE PULSING DEVICE
Filed July 1, 1943
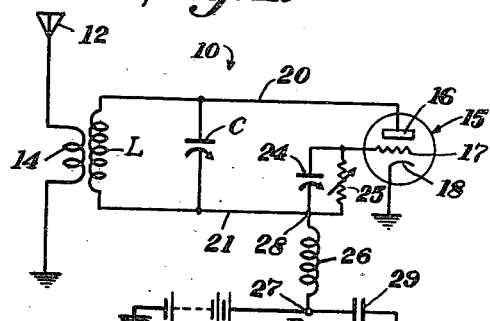
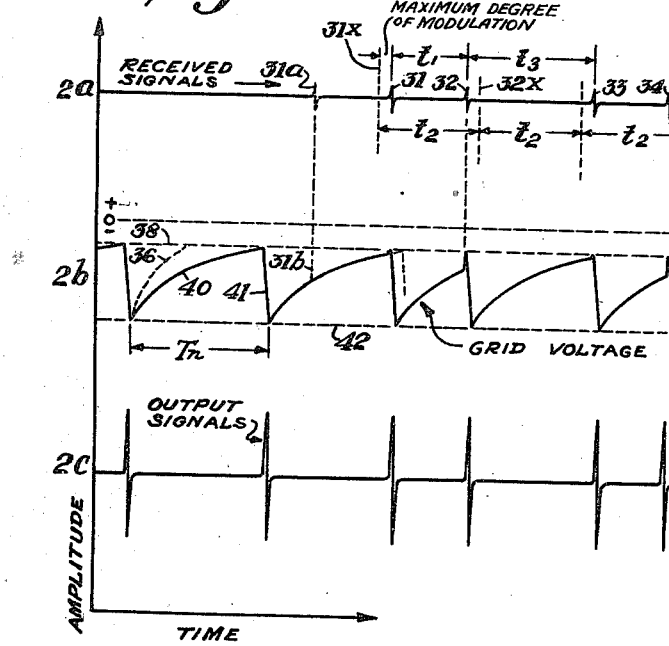
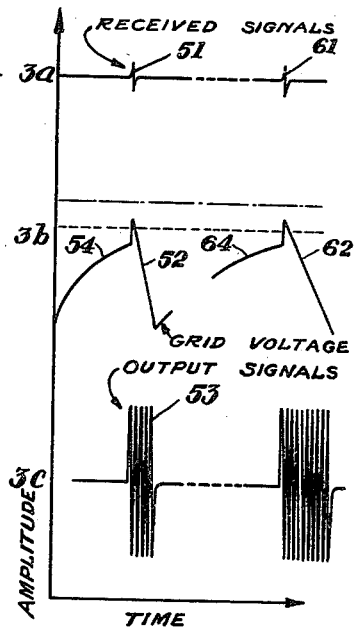
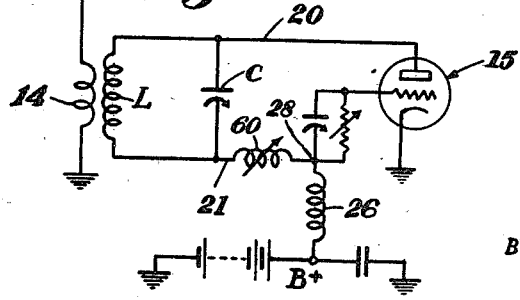
INVENTORS
EMILE LABIN
DONALD D. GRIEG
BY Percy P. Lantz
ATTORNEY Patented Apr. 29, 1947

2,419,571

UNITED STATES PATENT OFFICE 2,419,571

SELECTIVE PULSING DEVICE

Emile Labin, New York, and Donald D. Grieg, Forest Hills, N. Y., assignors to Federal Telephone and Radio Corporation, Newark, N. J., a corporation of Delaware Application July 1, 1943, Serial No. 492,996

4 Claims. (Cl. 250—15)

This invention relates to radio pulsing systems and more particularly to a pulsing device for repeating only those signal pulses having a repetition rate close to the normal pulsing rate of the device.

In radio communication systems operating at ultra-high frequencies, such as in the case of time modulation of narrow width pulses, considerable difficulty has heretofore been experienced in unreliable communication over short distances where the path of communication is over rough terrain or where the distance is extended to near the maximum range of the system. This unreliability of such ultra-high frequency communication systems is particularly troublesome for military uses in the case where the armed forces are advancing over rough terrain and desire intercommunication between detachments separated by high ridges or other obstructions. In the case of extended distances even where the terrain is fairly level, the communication may become unreliable because of adverse attenuation of the pulses.

It is one of the objects of our invention to provide a small compact selective pulsing device capable of relaying pulse signals at greatly intensified amplitude.

Another object of our invention is to provide a selective pulsing device which is highly selective of the pulse trains capable of triggering or pulling the device into synchronous operation therewith.

By locating the pulsing device of our invention at a high point on a ridge and by tuning the device to a pulsing rate substantially the same as the unmodulated pulse repetition rate of the T. M. pulses, the device will automatically synchronize with the T. M. pulses and relay the T. M. pulses with greatly intensified amplitude to the opposite side of the ridge. This relaying ability of the selective pulsing device may also be used for extending the path of communication whether or not the terrain is rough so as to avoid unreliable communication due to adverse attenuation of the pulses. In this connection it will be noted that the relaying function of the device is not easily jammed for the reason that the selectivity of the device eliminates unwanted pulses which occur at repetition frequencies differing even by a small amount from the normal repetition rate of the device.

Another important feature of the selective pulsing device of our invention is that the output pulses of the device may be varied as to width independently of the width of the input signals. Thus, one pulsing device may be adjusted for transmission of pulses of a given width while a second pulsing device may be adjusted to transmit pulses of an entirely different width. This feature together with the selective pulse frequency characteristic of the device may be utilized for identifying a signalling station or the location and identity of the craft carrying a pulsing device.

It is another object of the invention therefore, to provide a pulsing device which is responsive to signal pulses of a given repetition rate for radiating pulses of a selected width in synchronism with the signal pulses.

The above and other objects and features of the invention will become more apparent upon consideration of the following detailed description to be read in connection with the accompanying drawings, in which:

Fig. 1 is a schematic wiring diagram of a selective pulsing device according to our invention;

Fig. 2 is a graphical illustration of the operating steps of the device illustrated in Fig. 1;

Fig. 3 is a further graphical illustration showing the operating steps of the device when certain adjustments are made; and Fig. 4 is a schematic wiring diagram showing a modification of the invention.

Referring to Fig. 1, the selective pulsing device is shown to include an oscillating trigger circuit 10 having an LC resonant circuit tunable to any desired carrier wave the R. F. energy of which is obtainable from an antenna 12 through an antenna coupling coil 14. The oscillating circuit 10 includes a vacuum tube 15 having an anode 16, a control grid 17 and a cathode 18. One side 20 of the LC circuit is connected to the anode 16. The opposite side 21 is connected to the grid 17 through a blocking condenser 24 across which is connected an adjustable grid leak 25. The cathode 18 is connected to ground.

Positive energy is applied to the anode circuit of the oscillator through a high inductance coil 26 from a B+ battery terminal 27. This source of energy is applied to the oscillator circuit at a point 28 between the side 21 and the blocking condenser 24. Connected to the battery terminal 27 is condenser 29 which is grounded so as to remove any R. F. energy passed by the coil 26. The cathode 18 is heated by an "A" battery or other electrical source.

The pulsing rate of the device is controlled by the time constant of the grid circuit. The operating interval and therefore the pulse width output of the oscillating circuit 10 is controlled by adjustment of the capacitance 24 and the value of the grid leak 25.

Referring to Fig. 2, assume that curve 2a represents a time modulated pulse train having a series of pulses 31, 32, 33, 34, etc. modulated in "push-pull" manner such as disclosed in our copending application Serial No. 455,897, filed August 24, 1942. According to "push-pull modulation" the pulses vary in time by pairs. The pulses, for example, are displaced in "push-pull" in accordance with the instantaneous signal values between one extreme timing $t_1$ represented by pulses 31 and 32 and an opposite extreme timing $t_2$ represented by the broken lines 31x and 32x. While the smallest timing interval is $t_1$, the interval $t_2$ is not the greatest. Instead the greatest timing interval between adjacent pulses is the interval $t_3$ between the second pulse 32 of the first pair and the first pulse 33 of the second pair. It will be understood that in connection with curve 2a the graph of Fig. 2 is exaggerated dimension-wise in order to illustrate the time displacement of the signal pulses which for pulses of a width of 1 or 2 microseconds may not be any greater than the width of the signal pulse.

Besides the illustrated "push-pull modulation" of pulses, there are, of course, many other principles of time modulation with which the selective pulsing device of our invention may be used. The only prerequisite is that the T. M. pulses occur within two fairly close timing limits.

Curve 2b represents generally the grid voltage of the control grid 17. During normal operation, that is, normal pulsing of the device without the presence of signal pulses, the control grid voltage may be adjusted substantially as indicated for operation at a period $T_n$ at least equal to, and preferably slightly greater than, the interval $t_2$. It will be observed that when the signal pulses are tuned in by the LC circuit, the signal pulses will not synchronize the oscillating circuit unless they occur at substantially the normal pulsing rate of the circuit. The degree of selectivity of the oscillating circuit to the pulses may be controlled by varying the time constants of the grid circuit. For example, should the resistance of the grid leak 25 be reduced the blocking negative charge on the condenser 24 will leak off more rapidly as indicated by the broken line 36. In such a case the pulse repetition rate of a source of signals must be more nearly the same as the normal pulsing rate of the circuit before synchronization can be had.

The capacitance of the blocking condenser 24 also enters into the steepness control of the curve portion 36, as will be understood by those skilled in the art. Adjustment of the capacitance, however, may be used mainly to control the width of the output pulses of curve 2c. For example, when the grid voltage builds up or becomes less negative to the critical level 38 as indicated by the portion 40, the circuit commences to oscillate thereby building up a negative charge upon the condenser 24 as indicated by the portion 41 of the curve 2b. The inclination of the portion 41 is dependent mainly upon the capacity of the condenser 24 and the grid-cathode resistance of the tube 15. When the negative charge reaches a critical negative value indicated by the level 42, the negative charge biases the grid 17 so as to block further oscillations thereby terminating the output pulse.

It will be observed that the signal pulse 31 is shown to occur at a time when the grid voltage has returned to a point near the critical level 38 so that the added voltage of the pulse is sufficient to trigger the circuit. Should the pulse occur a short interval ahead of this point as indicated by the broken line pulse 31a, the added voltage 31b would be insufficient to trigger the circuit. Since the pulse repetition rate of the signal is slightly higher than the normal pulsing rate of the circuit, a pulse such as pulse 31 will soon occur in the train to cause the oscillating circuit to be pulled into synchronism with the signal pulses. When this occurs the oscillating circuit will be synchronized with the time modulated pulses thereby producing an output which carries the time displacement of the signal pulses. The two pairs of pulses 31, 32 and 33, 34 are shown for purposes of illustration representing the greatest difference in timing obtainable during modulation and since the maximum displacement of the pulses is exceptionally small compared to the interval between pulses, the oscillating circuit will not fall out of synchronism because of differences in time displacement of the signal pulses.

Where it is desirable to change the width of the output pulse of the oscillating circuit, this may be accomplished by varying the capacitance 24. In Fig. 3, the effect of changing the capacitance 24 for two different adjustments is illustrated. Curve 3a represents two signal pulses 51 and 61, curve 3b represents generally the grid voltage of the circuit and curve 3c represents the output of the circuit in accordance with the two adjustments. The capacitance 24 is increased from the condition of Fig. 2 to the operating condition corresponding to the first signal pulse 51 in Fig. 3, whereby the build-up of the negative charge on the condenser follows a slower rate as indicated by the portion 52 of the curve 3b. This accordingly increases the duration of the output pulse 53. The second pulse 61 is shown to have triggered the circuit when the capacitance was adjusted for a larger value as indicated by the still slower build-up rate 62 which gives an output pulse 63 of still greater width.

While this variation in width may be controlled by adjusting the capacitance 24, it will be understood that the variation will be accompanied by a corresponding change in the time constant of the grid leak 25 and the capacitance 24 thus simultaneously changing the natural repetition triggering period of this circuit. Hence to maintain a constant natural period while varying the width of the transmitted pulse, it is necessary to readjust the value of the grid leak 25. Where frequent adjustment is desirable these constants may be ganged so that adjustment for either width or frequency does not affect the other.

It will be noted that the leading edges of the output pulses substantially coincide with the leading edges of the signal pulses. This relationship may be varied if desired by placing an inductance 60 (Fig. 4) either fixed or adjustable in the side 21 of the oscillating circuit between the resonant circuit LC and the point 28. This inductance operates to delay the application of the signal energy to the grid 17. Thus, the relaying or repeating of a signal by our pulsing device may be delayed a selected interval of time if desired.

While we have shown and described the principles of our invention with regard to relaying time modulated signal pulses, it will be understood that the pulsing device of our invention is useful for relaying or repeating signal pulses for many other purposes. For example, the signal pulse may be an inquiring pulse transmitted by a lookout station to determine whether an approaching plane is friendly or not. If the plane is friendly and is provided with a pulsing device according to our invention, the time constants of the device can be so chosen as to give a responding pulse at a given frequency so that when the inquiring pulses are of a frequency near the normal operating frequency of the device, synchronizing of the device is obtainable thereby indicating to the lookout of the identity of the plane. It will also be recognized that should the time constants of the pulsing device carried by the plane be adjusted to provide an output pulse of a given width, such will serve not only to identify the plane as friendly but also as to what particular service the plane belongs. It will be understood, therefore, that the illustrations herein shown and described are given as illustrative of the invention only and not as limiting the scope of the invention.

We claim:

1. A selective pulsing device for relaying at greatly amplified intensity the pulses of a pulse modulated carrier wave comprising an oscillating trigger circuit adjustable for normal interval operation at a slightly lower pulsing rate than the lowest pulse timing of said carrier wave, said trigger circuit having a vacuum tube with a control grid, a control circuit for said oscillating circuit, means to apply energy of the carrier wave to the control circuit to trigger said oscillating circuit for an operating interval in response to each pulse of said carrier wave, said control circuit including the grid of said tube together with a resistance-capacitance combination adjustable to control the timing of said normal interval operation, whereby the duration of the output pulse oscillations is adjustable, and said energy applying means being adapted to receive and radiate energy from said oscillating circuit during the operating interval thereof.

2. A pulsing device for relaying at greatly amplified intensity the pulses of a pulse modulated carrier wave comprising an oscillating trigger circuit having a tunable radio frequency circuit, antenna means coupled to said tunable circuit, a vacuum tube having plate, grid and cathode electrodes, a plate circuit including said radio frequency circuit for said plate electrode, an inductance element, a source of positive voltage connected through said inductance element to said plate circuit, a grid circuit for said grid electrode, said grid circuit having a resistance-capacitance parallel combination to control the normal operation of said oscillating circuit and means connecting said grid circuit to said plate circuit between said inductance element and said radio frequency circuit.

3. The pulsing device defined in claim 4 further including an inductance element connected between said radio frequency circuit and said grid circuit for delaying for a predetermined interval the triggering action of pulses of said carrier wave.

4. A selective pulsing device for relaying at greatly amplified intensity the pulses of a pulse modulated carrier wave comprising an oscillating trigger circuit adjustable for normal interval operation at a slightly lower pulsing rate than the lowest pulse timing of said carrier wave, a control circuit for said oscillating circuit, means to apply energy of the carrier wave to the control circuit to trigger said oscillating circuit for an operating interval in response to each pulse of said carrier wave, and said control circuit including means to delay for a predetermined time interval the controlling action of the oscillating circuit in response to pulses of said carrier wave.

EMILE LABIN.
DONALD D. GRIEG.

REFERENCES CITED

The following references are of record in the file of this patent:

FOREIGN PATENTS

| Number | Country | Date |
| --- | --- | --- |
| 521,139 | British | May 13, 1940 |